Figure 1:
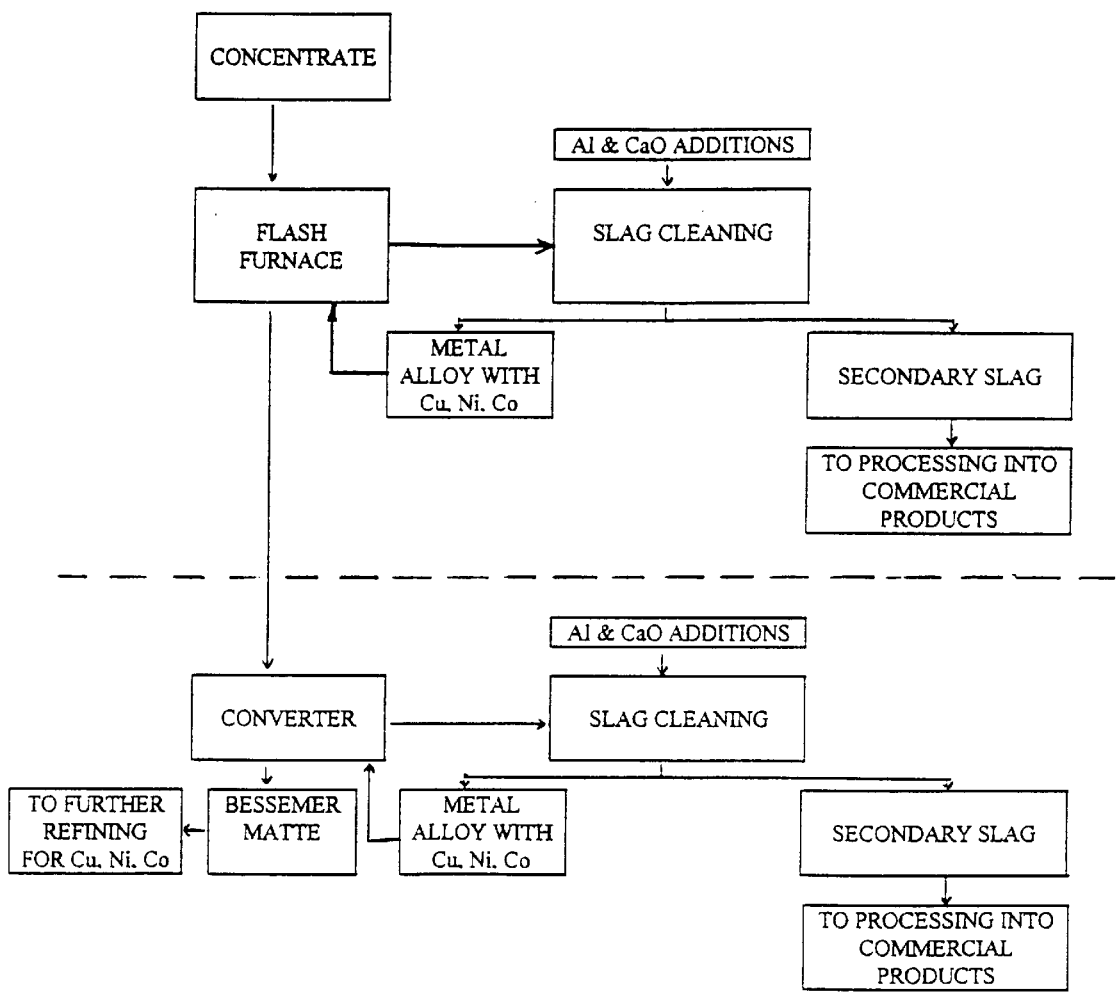

United States Patent

Krofchak et al.

[11] Patent Number: 5,865,872
[45] Date of Patent: *Feb. 2, 1999

[54] METHOD OF RECOVERING METALS AND PRODUCING A SECONDARY SLAG FROM BASE METAL SMELTER SLAG

[75] Inventors: David Krofchak, Copper Cliff; Werner Dresler, Sudbury, both of Canada

[73] Assignee: Fenicem Minerals Inc., Copper Cliff, Canada

[ * ] Notice: The term of this patent shall not extend beyond the expiration date of Pat. No. 5,626,646.

[21] Appl. No.: 815,508

[22] Filed: Mar. 12, 1997

Related U.S. Application Data

[63] Continuation-in-part of Ser. No. 663,724, Jun. 14, 1996, Pat. No. 5,626,646, which is a continuation-in-part of Ser. No. 494,665, Jun. 26, 1995, Pat. No. 5,593,493.

[51] Int. Cl.$^6$ .............................. C22B 5/04; C21B 15/02
[52] U.S. Cl. .......................... 75/10.35; 75/959; 75/500; 420/590
[58] Field of Search .................... 75/959, 10.35, 75/500; 420/590

[56] References Cited

U.S. PATENT DOCUMENTS 5,496,392 3/1996 Sims et al. .............................. 75/959
5,626,646 5/1997 Krofchak .................................. 75/500

FOREIGN PATENT DOCUMENTS 926047 5/1982 Russian Federation .............. 75/10.35

*Primary Examiner*—Melvyn Andrews
*Attorney, Agent, or Firm*—Rogers & Scott

[57] ABSTRACT

A method of recovering metals and producing a secondary slag from base metal smelter slag produced by a copper or nickel smelter includes mixing the smelter slag with at least one reducing agent selected from the group consisting of carbon, calcium carbide, ferrosilicon and aluminum, said carbon and calcium carbide (if present) being from about 1% to about 40% by weight of the slag and said aluminum (if present) being from about 2% to about 35% by weight of the slag and with from zero to about 70% calcium oxide by weight of the slag, heating the mixture aluminothermically if Al is present as reducing agent above the melting point to reduce the smelter slag to a metal alloy containing iron and possibly silicon and aluminum, depending on the quantity of aluminum added to the smelter slag, and heavy metals such as copper, nickel and cobalt which were in the smelter slag and thereby also producing a secondary slag containing at least one compound selected from the group consisting of calcium silicate, calcium aluminate, fused alumina and calcium iron aluminum silicate, and separating the metal alloy from the secondary slag.

11 Claims, 1 Drawing Sheet

FLOW DIAGRAM

FLOW DIAGRAM

METHOD OF RECOVERING METALS AND PRODUCING A SECONDARY SLAG FROM BASE METAL SMELTER SLAG

This application is a continuation-in-part of U.S. patent application Ser. No. 08/663,724, filed on Jun. 14, 1996 now U.S. Pat. No. 5,626,646 which is a continuation-in-part of U.S. patent application Ser. No. 08/494,665 filed Jun. 26, 1995, now U.S. Pat. No. 5,593,493 issued Jan. 14, 1997.

FIELD OF INVENTION

This invention relates to the recovery of metals and production of a secondary slag from base metal smelter slags produced by copper and nickel smelters.

BACKGROUND OF THE INVENTION

Copper and nickel concentrates are usually processed in smelters, which melt the concentrate to a form of metal containing matte and a slag essentially composed of iron silicate containing often small, but also—depending on the furnace operation—sometimes significant amounts of valuable metals, such as copper, nickel, and cobalt.

In Canada, smelters produce over 12 million tons of iron silicate slags. Since 1900, some uses for these slags have been found, such as for rail ballast, road base and backfill, but such known uses have not been sufficient to utilize the amount of slag produced. Considerable research has been carried out to attempt to lessen the amount of metals lost in the slag and/or recover these metals from the slag. So far as is known, no economically viable process has been found to recover these lost metals, and as a result large slag heaps have accumulated adjacent to the smelters.

As water pollution control standards have developed, it has been found that the large slag heaps are leaching unacceptably high amounts of heavy metals, and mining companies are seeking acceptable solutions to this growing problem. Also, environmental authorities are demanding that plans be filed with the appropriate government agencies to provide commitments for long term permanent solutions to this problem. It is therefore an objective of the invention to provide a method of treating base metal smelter slags to recover metals and to produce a secondary slag that is environmentally safe and can readily be utilized in other industries, such as in the cement industry.

SUMMARY OF THE INVENTION

According to the invention, a method of recovering metal values and producing a secondary slag from base metal smelter slag produced by a copper or nickel smelter, the smelter slag contains iron silicate and other metallic compounds and elements including (by weight):

from about 10% to about 50% $SiO_2$,
from about 0% to about 10% $Al_2O_3$,
from about 25% to about 50% Fe mainly as FeO and $Fe_3O_4$,
from about 0% to about 20% CaO,
from about 0% to about 15% MgO,
from about 0% to about 15% Cu,
from about 0% to about 15% Ni,
from about 0% to about 7% Co,
from about 0.2% to about 3% S comprises mixing the smelter slag with at least one reducing agent selected from the group consisting of carbon, calcium carbide, ferrosilicon and aluminum, said carbon and calcium carbide (if present) being from about 1% to about 40% by weight of the slag and said aluminum (if present) being from about 2% to about 35% by weight of the slag and from zero to about 70% calcium oxide by weight of the slag. This mixture is heated aluminothermically (if aluminum is present as reducing agent) above the melting point to reduce the smelter slag to a herein called metal alloy which contains iron and possibly silicon, depending on the quantity of aluminum added to the smelter slag, and at least about 95% of the copper, nickel and cobalt which is present in the smelter slag. As a co-product of this reduction process, a herein called secondary slag is produced containing at least one compound selected from the group consisting of calcium silicate, calcium aluminate, fused alumina and calcium iron aluminum silicate. The secondary slag separates well from the metal alloy due to the difference in their specific gravities.

The produced metal alloy which can contain significant quantities of iron (from about 10% to about 95% iron), silicon (from zero to about 30% silicon, ferrosilicon) and eventually metallic aluminum, also containing copper, nickel and cobalt, can be reused as a reducing agent for the control of metal oxide sludges. The produced secondary slag, depleted of copper, nickel and cobalt, may be crushed and ground to a size suitable for use as aggregate for concrete, refractory aggregate and various grades of cement.

The base metal smelter slag may be treated and cleaned in various locations or reactor sites for the recovery of the metal alloy containing copper, nickel and cobalt. Those sites may be a refractory lined vessel, an iron or steel tapping pot, portions of a flash furnace or reverberatory furnace, a converter (type of bessemer refining converter), a DC or AC electric-arc furnace or an adequately refractory lined pit and other methods readily apparent to anyone skilled in the art.

The base metal slag is usually produced in one of two types of operations as indicated in the examples outlined in FIG. 1: The first operation consists usually of a flash furnace, reverberatory furnace or electric furnace operation. The second operation is a converter operation, commonly called bessemer converter operation. The first operation generally utilizes base metal concentrates in, for example, flash furnaces and produces a matte and said base metal slag. This slag is usually relatively low in copper, nickel and cobalt content (about from 0.1 to about 2% for each of the said metals) and is usually discarded as described above. The second operation, the converter operation, usually receives the matte from the first operation and produces a high grade matte in conjunction with a said base metal slag which is relatively high in copper, nickel and cobalt content ranging from about 0.5% to about 15% and more commonly from about 1% to about 6% for each of the said metals. This slag is usually recycled back into the first operation in order to recover some of the copper, nickel and cobalt values. In actual industrial practice, this slag recycling procedure is a highly inefficient and ineffective process, mainly because only portions of the valuable metals are recovered and most of the slag volume is occupying valuable furnace capacity without undergoing essentially any metallurgical processes. The proposed invention dramatically increases the efficiency and effectiveness of the first operation, because the converter slag does not need to be recycled to the first operation. According to the proposed invention, the converter slag will be directly reduced to produce a high valued said metal alloy that is directly absorbed in the converter matte also directly cleaning the converter sludge and the said secondary slag which is essentially free of copper, nickel and cobalt and can be used readily in other industries.

The composition of said metal alloy can be controlled by the quantity of reducing agent added, and can cover wide ranges of composition. For example, 25% aluminum additions to a flash furnace slag may yield a metal alloy with the approximate composition of 79% Fe, 0.4% Co, 1.2% Ni, 1% Cu, and 15.6% Si, while, for example, 5% aluminum additions to a converter slag may yield a metal alloy with the approximate composition of 36% Fe, 11% Co, 33% Ni, 14% Cu, 0.00% Si and 0.8% S.

The reducing agent, for example comprising aluminum and calcium oxide, may be added into the flash furnace, converter or AC or DC electric-arc furnace to their respective slags before slag tapping of each furnace has occurred, thus producing the metal alloy, which ultimately will be oxidized in the process, whereby copper, nickel and cobalt will be absorbed in the matte. The slag, depleted of the copper, nickel and cobalt, can be tapped in the usual manner and used for its proposed purposes.

In the event that the base metal slag is transferred to a vessel or iron-steel tapping pot, the slag may be poured in a molten state into the vessel or tapping pot containing or to which is added said reducing agent and calcium oxide (if present) in the required amounts to produce said metal alloy and said secondary slag.

In the event that the base metal slag is poured in a molten state over the reducing agent in the form of aluminum metal into a fused alumina lined pit to produce said metal alloy and said secondary slag, the secondary slag will consist of essentially fused alumina for use in high temperature refractories.

The composition of the metal alloy with respect to its silicon content may be varied by adjusting the amount of reducing agent added to the smelter slag, thus producing a special metal alloy, a ferrosilicon alloy, containing copper, nickel and cobalt.

The calcium oxide (if present in the reducing agent mixture) may be provided as a mixture of calcium carbonate and calcium oxide or as calcium carbonate.

Scrap iron may be added to the smelter slag and reducing agent to produce a desired iron to silicon ratio in the ferrosilicon.

In a modification of the above method, the method may be conducted in two stages by first adding a minimum amount of reducing agent sufficient to produce a metal alloy comprising iron containing about 95% of the contained copper, nickel and cobalt, removing this metal alloy by a suitable tapping procedure, and then adding more reducing agent to produce ferrosilicon essentially free of copper, nickel and cobalt and said slag comprising calcium aluminate or a calcium aluminum silicate compound.

Examples of the invention will now be described.

EXAMPLES OF THE INVENTION

Example 1

A composite sample of base metal smelter slag was obtained from a slag heap which has accumulated slag for over 50 years from INCO's smelters at Sudbury, Ontario, Canada. This is one of the largest smelter complexes in the world and produces some 1,200,000 tons of slag per year. The analysis of a typical slag, a flash furnace discard slag (by weight), was:

| | | | |
|---|---|---|---|
| FeO | 53.0% (with some present as $Fe_3O_4$) | MgO | 2.3% |
| $SiO_2$ | 32.8% | Cu | 0.54% |
| $Al_2O_3$ | 4.5% | Ni | 0.6% |
| CaO | 2.1% | Co | 0.2% |
| S | 1.4% | | |

| Furnace Charge (laboratory scale): | | |
|---|---|---|
| Smelter slag | 100 g | |
| Al | 30 g | (30% of smelter slag) |
| CaO | 60 g | (60% of smelter slag) |
| | 90 g | |

Note 1:
The charge was selected to produce a metal alloy containing relatively high silicon content (ferrosilicon alloy) and a high grade calcium aluminate secondary slag.

A clay crucible was lined with magnesia refractory cement to avoid contamination of the secondary slag. The crucible was heated until ignition of the aluminothermic reaction commenced. The entire melt test was completed after 15 minutes, and the final temperature was in excess of 4000° F. After 1 hour cooling, the sample was removed from the crucible and the metal alloy button was easily separated from the secondary slag and both metal alloy and secondary slag were separately weighed.

| Products: | |
|---|---|
| Secondary Slag | 134 g |
| Metal Alloy Button | 56 g |
| | 190 g |

Note 1:
This balances with the charge.
Note 2:
Metal alloy button was 56% of the original smelter slag.

| Analysis of Products: | |
|---|---|
| Recovered Metal Alloy Button (Ferrosilicon) | Secondary Slag (Calcium Aluminate) |
| Fe 74% | FeO 1% |
| Si 22% | $SiO_2$ 5% |
| Al 0% | $Al_2O_3$ 45% |
| Ca 0% | CaO 47% |
| Mg 0% | MgO 1.7% |
| Cu 1% | Cu 0% |
| Ni 1.1% | Ni 0% |
| Co 0.36% | Co 0% |
| S 0% | S 1.3% |

Observations and conclusions from this test are:

a) The smelter slag was completely reduced to usable products, ie.: Metal alloy, ferrosilicon (FeSi) with a silicon content of 22% and a high quality calcium aluminate secondary slag.

b) All the base metals, namely Cu, Ni and Co, reported to the metal alloy and only less than 0.01% remained in the secondary calcium aluminate slag.

c) A comparison of calcium aluminate produced by cement companies which manufacture calcium aluminate confirms the high quality product generated in this example, as follows:

|  | Secondary Slag (Calcium Aluminate) | A Cement Companies's Calcium Aluminate |
| --- | --- | --- |
| $Al_2O_3$ | 46% | 39% |
| CaO | 47% | 38% |
| $SiO_2$ | 5% | 5% |
| FeO | 1% | 16% |
| MgO | 1.5% | 0.2% |
| S | 1% | 0.2% | d) This sample was selected because it uses a very high amount of aluminum reducing agent to produce a very large amount and high value of products from a base metal slag. Essentially, there would be no benefit in adding more reducing agents.

Numerous other experiments were conducted using progressively less reducing agent and CaO and also repeating many of the experiments (in total over 170 experiments) all of which produced results that stoichiometric mass balanced calculations predicted, thus assuring predictability of the invention to produce consistently reliable results.

Accordingly, it is understood that many variations can be made to the above described process, typical of which are the following examples using progressively less reducing agents. The same composite sample of smelter slag was used for all tests such that the analysis of the base metal slag was the same as that shown in Example 1 for all test examples.

| Example Number | 1 | 2 | 3 | 4 | 5 | 6 |
| --- | --- | --- | --- | --- | --- | --- |
| ← all in grams → | | | | | | |
| Smelter Slag Charge | 100 | 100 | 100 | 100 | 100 | 100 |
| Aluminum | 30 | 25 | 20 | 15 | 10 | 5 |
| Calcium Oxide | 60 | 50 | 40 | 30 | 20 | 10 |
| Total Weights | 190 | 175 | 160 | 145 | 130 | 115 |
| ← all in grams → | | | | | | |
| Metal Alloy Buttons | 56 | 52 | 48 | 44 | 30 | 14 |
| Analysis of Metal Alloy Buttons in % weight | | | | | | |
| Fe | 74 | 79 | 86 | 93 | 91 | 80 |
| Si | 22 | 16 | 9 | 0.7 | 0 | 0 |
| Al | 0 | 0 | 0 | 0 | 0 | 0 |
| Ca | 0 | 0 | 0 | 0 | 0 | 0 |
| Mg | 0 | 0 | 0 | 0 | 0 | 0 |
| Cu | 1 | 1 | 1.2 | 1.2 | 1.8 | 3.9 |
| Ni | 1 | 1.1 | 1.2 | 1.4 | 2 | 4.3 |
| Co | 0.36 | 0.4 | 0.42 | 0.46 | 0.68 | 1.4 |
| S | 0 | 0 | 0.2 | 1 | 1.5 | 2 |
| ← all in grams → | | | | | | |
| Secondary Slag | 133 | 122 | 110 | 99 | 99 | 100 |
| Analysis of Secondary Slag in % Weight | | | | | | |
| FeO | >1 | >1 | >1 | >1 | 19 | 39 |
| $SiO_2$ | 5.3 | 11 | 21 | 32 | 33 | 33 |
| $Al_2O_3$ | 46 | 43 | 38 | 33 | 24 | 14 |
| CaO | 46 | 43 | 37 | 32 | 22 | 12 |
| MgO | 2.3 | 2.3 | 2.3 | 2 | 1.9 | 1.7 |
| Cu | <0.02 | <0.02 | <0.05 | <0.05 | <0.05 | <0.08 |
| Ni | <0.02 | <0.02 | <0.05 | <0.05 | <0.05 | <0.08 |
| Co | <0.02 | <0.02 | <0.05 | <0.05 | <0.05 | <0.08 |
| S | 1 | 1 | 0.9 | 0.8 | 0.7 | 0.7 |

A similar series of tests was conducted with a base metal converter slag instead of flash furnace smelter slag and the test results are listed below in Examples 7 to 12. The analysis of a typical converter slag (by weight) was:

| FeO | 53.5% (with some present as $Fe_3O_4$) | MgO | 1.0% |
| --- | --- | --- | --- |
| $SiO_2$ | 32.3% | Cu | 1.84% |
| $Al_2O_3$ | 0.7% | Ni | 4.25% |
| CaO | 1.5% | Co | 1.65% |
| S | 0.5% | | |

| Example Number | 7 | 8 | 9 | 10 | 11 | 12 |
| --- | --- | --- | --- | --- | --- | --- |
| ← all in grams → | | | | | | |
| Smelter Slag Charge | 100 | 100 | 100 | 100 | 100 | 100 |
| Aluminum | 30 | 25 | 20 | 15 | 10 | 5 |
| Calcium Oxide | 60 | 50 | 40 | 30 | 20 | 10 |
| Total Weights | 190 | 175 | 160 | 145 | 130 | 115 |
| ← all in grams → | | | | | | |
| Metal Alloy Buttons | 61 | 57 | 53 | 44 | 28 | 12 |
| Analysis of Metal Alloy Buttons in Weight % | | | | | | |
| Fe | 70 | 75 | 80 | 81 | 71 | 36.5 |
| Si | 21 | 16 | 10.5 | 3.9 | 0 | 0 |
| Al | 0 | 0 | 0 | 0 | 0 | 0 |
| Ca | 0 | 0 | 0 | 0 | 0 | 0 |
| Mg | 0 | 0 | 0 | 0 | 0 | 0 |
| Cu | 2.9 | 3.1 | 3.4 | 4.1 | 6.3 | 14.1 |
| Ni | 7.0 | 7.5 | 8.0 | 9.8 | 15.1 | 33.6 |
| Co | 2.7 | 2.9 | 3.1 | 3.8 | 5.8 | 11.6 |
| S | 0 | 0 | 0.1 | 0.5 | 0.7 | 0.8 |
| ← all in grams → | | | | | | |
| Secondary Slag | 131 | 120 | 109 | 103 | 104 | 104 |
| Analysis of Secondary Slag in Weight % | | | | | | |
| FeO | >1 | >1 | >1 | 9 | 28 | 47 |
| $SiO_2$ | 8 | 16 | 25 | 32 | 31.1 | 31 |
| $Al_2O_3$ | 44 | 40 | 35 | 28 | 20 | 10 |
| CaO | 47 | 43 | 38 | 30 | 21 | 11 |
| MgO | 0.8 | 0.8 | 0.9 | 0.7 | 1 | 1 |
| Cu | <0.02 | <0.02 | <0.05 | <0.05 | <0.1 | <0.2 |
| Ni | <0.02 | <0.02 | <0.05 | <0.05 | <0.1 | <0.2 |
| Co | <0.02 | <0.02 | <0.05 | <0.05 | <0.1 | <0.2 |
| S | 0.5 | 0.4 | 0.4 | 0.3 | 0.2 | <0.2 |

For examples 1 to 12, the analyses are approximate because they were carried out with an X-Ray and ICP multi-element systems which were not calibrated for some of these particular elements. Nevertheless, the tables illustrate proportional increase of metal recovery versus the amount of aluminum reducing agent used and, with respect to the secondary slags, varying composition of Fe, Si, Al and Ca which would for each of examples 1,2,3,4,5,6,7,8,9,10, 11 and 12 have different cementitious and refractory properties. It should be noted and understood that in examples where 7% Al and less is used, some previous recovered metal alloy or Fe may advantageously be added to reduce excessive oxides such as $Fe_3O_4$ to FeO and thus economizing on Al.

Example 13

This example was designed to show, if carbon is added together with aluminum, the combined effect is to increase the metal yield. To show this, two melt tests were conducted using exactly the same ingredient weights except that, in the second test, some carbon was added as follows:

|  | Test 1 | Tests 2 |
| --- | --- | --- |
| Weight of Base Metal Slag | 100 g | 100 g |
| Aluminum | 10 g | 10 g |

-continued

|  | Test 1 | Tests 2 |
| --- | --- | --- |
| Calcium Oxide | 20 g | 20 g |
| Carbon | none | 4 g |
|  | 130 g | 133 g |
| After melting, weight of metal produced | 30 g | 33 g |

The test with carbon produced 10% more metal. This is an important example of the invention because carbon is substantially less costly than aluminum and therefore the ability to use some carbon enhances the economics.

Example 14

A sample of the secondary slag, identified as calcium aluminate, and as produced in Example 1, was crushed to -¼ inch down to about 100 mesh and a sample of this was in turn ground to about 325 mesh. Then, 4 parts by weight of the -¼ inch crushed slag was mixed with 1 part by weight of the -325 mesh material and water added in the amount of 0.4 water to 1 part -325 mesh, the cement component.

The mixture was then cast into 2 inch cubes and allowed to set. After 7 days, the compressive strength was 2600 psi. A 2 inch cube was placed in a gas fired furnace and heated to about 2400 degrees F. for several hours. After cooling, the cube still had its structural integrity and had changed its colour from the original grey colour to a straw yellow, which is the typical colour of a calcium aluminate refractory brick after firing.

This example indicates that the secondary slag has refractory brick qualities when it is produced from an original base metal slag with sufficient aluminum reducing agent and calcium oxide additions to generate calcium aluminate refractory.

Example 15

This example is based on two different base metal slags; one slag, designated as "New Flash Furnace" slag with relatively high Cu and Ni concentrations and another slag designated "Reverberatory Furnace" slag with relatively low Cu and Ni concentrations. The significant differences in the Cu and Ni content are due to the nature of the furnace characteristics since the Reverberatory Furnace is an older process operation working with a low productivity. The analyses are shown in the following comparison (in weight %):

|  | New Flash Furnace | Reverberatory Furnace |
| --- | --- | --- |
| FeO (some present as Fe$_3$O$_4$) | 46 | 46 |
| SiO$_2$ | 32 | 32 |
| Cu | 0.8 | 0.2 |
| Ni | 1.0 | 0.4 |
| Co | 0.22 | 0.2 |

The objective of this example is to demonstrate that, in adding the aluminum reductant as in Example 5, the recovery of Cu, Ni and Co was complete in both cases, thus showing that the valuable metal components of the slag are preferentially recovered with minimum additions of aluminum, and any further additions of aluminum, as shown in Examples 1,2,3 and 4 mainly lead just to additional iron and silicon formation in form of ferrosilicon.

The materials charged for both melting tests were:

| Smelter Slag | 100 g |
| --- | --- |
| Aluminum | 10 g |
| Calcium Oxide | 20 g |
|  | 130 g |

|  | New Flash Furnace Slag Used | | Reverberatory Slag Used | |
| --- | --- | --- | --- | --- |
| Metal Alloy weight | 26 g | | 26 g | |
| Secondary Slag weight | 102 g | | 102 g | |
|  | 128 g | | 128 g | |
|  | ← Analyses (% by weight) → | | | |
|  | Metal Alloy | Slag | Metal Alloy | Slag |
| Fe | 85 | 19.3 | 90 | 19.3 |
| Si | 4 | 30 | 4 | 30 |
| Cu | 2.84 | 0.02 | 0.8 | <0.05 |
| Ni | 3.86 | 0.08 | 1.6 | <0.04 |
| Co | 0.88 | 0.02 | 0.8 | <0.02 |

Note 1:
Al and Ca omitted from analyses as not required in example.
Note 2:
For the slag, Fe as FeO and Si as SiO$_2$.

Calculations show that over 95% of Cu, Ni and Co reported to the metal alloy button, thus providing a method of maximizing the recovery of Cu, Ni and Co at the minimum of cost in a situation whereby high amounts of ferrosilicon, FeSi, are not required, or where a second stage reduction is required to produce FeSi essentially free of Cu, Ni and Co.

Example 16

Concrete was made from a new product slag which was produced from a 10% Al and 20% CaO reaction with flash furnace slag. This grade of new product slag was identified as an obsidian glass. The composition was analysed as follows: FeO 28%, SiO$_2$ 30%, Al$_2$O$_3$ 19%, CaO 21%, Cu, Ni and Co were less than 0.08%. This slag was ground to -325 mesh and a blended cement made using 25% and 50% additions with Type 3 Portland cement and similarly with Type 1 Portland Cement. A control sample of concrete was made for comparison purposes. All these tests were done in accordance with comparable ASTM standards but using concrete sand.

|  | Compressive Strength of 2" Cubes in psi | |
| --- | --- | --- |
|  | 7 Day | 28 Day |
| 100% Type 1 PC Control | 4660 | 5617 |
| 100% Type 3 PC Control | 6233 | 7102 |
| 50% Slag 50% Type 1 PC | 4550 | 8105 |
| 25% Slag 75% Type 3 PC | 5612 | 7688 |
| 50% Slag 50% Type 3 PC | 4012 | 6753 |

The above results show that a blended cement of 50/50 ground slag with Portland cement makes acceptable concrete when compared to a normal Portland cement concrete. Further, since the ground slag cement has had the heavy metals removed, the new concrete is environmentally friendly.

Example 17

A leach test on the new product slag used in Example 16 was made to ascertain whether any metals would leach out under adverse "acidic rain" conditions.

Accordingly, 1000 ml of water was reduced to pH 2 with sulphuric acid and 100 g of −325 mesh ground new product slag produced from a 10% Al and 20% CaO addition to the flash smelter slag and which was melted aluminothermically.

Similarly, regular untreated smelter slag was ground to −325 mesh and was leached as a comparison. The results are as follows listed in ppm:

| Element | Untreated Slag | New Product Slag | Regulations as per EPA |
|---|---|---|---|
| Fe | 160.3 | ND | 1.0 |
| Cu | 46.02 | ND | 0.3 |
| Ni | 39.01 | ND | 0.3 |
| Co | 0.97 | ND | 0.3 |

As can be seen by above table, the smelter slag has been converted into an environmentally clean new product slag.

Other embodiments of the invention will be readily available to a person skilled in the art, the scope of the invention being defined in the appended claims.

We claim:

1. A method of recovering metals and producing a secondary slag from base metal smelter slag, said smelter slag comprising at least one heavy metal selected from the group consisting of copper, nickel and cobalt and also comprising iron silicate and other metallic compounds and elements including (by weight):

from about 10% to about 50% $SiO_2$,
from about 0% to about 10% $Al_2O_3$,
from about 25% to about 50% Fe,
from about 0% to about 20% CaO,
from about 0% to about 15% MgO,
from about 0% to about 15% Cu,
from about 0% to about 15% Ni,
from about 0% to about 7% Co,
from about 0.2% to about 3% S said method comprising: mixing the smelter slag with at least one reducing agent containing aluminum, said aluminum being from about 2% to about 35% by weight of the slag, and up to about 70% calcium oxide by weight of the slag, heating the mixture aluminothermically above the melting point to reduce the smelter slag to a metal alloy containing iron, and said at least one heavy metal which was in the smelter slag and thereby also producing a secondary slag containing at least one compound selected from the group consisting of calcium silicate, calcium aluminiate, fused alumina and calcium iron aluminum silicate, and separating the alloy from the secondary slag.

2. A method according to claim 1 wherein the base metal smelter slag is poured in a molten state into a vessel containing or to which is added a prepared mixture of said reducing agent and calcium oxide in the required amounts to produce said metal alloy and said secondary slag.

3. A method according to claim 1 wherein said reducing agent comprises carbon which together with said smelter slag and said calcium oxide is melted to produce said metal alloy and said secondary slag.

4. A method according to claim 1 wherein the calcium oxide is provided as a mixture of calcium carbonate and calcium oxide or as calcium carbonate to reduce excessive temperatures while at the same time converting the $CaCO_3$ to CaO.

5. A method according to claim 1 wherein the smelter slag is poured in a molten state in a fused alumina lined pit or vessel containing or to which is added said reducing agent in the form of aluminum metal to produce a secondary slag containing essentially fused alumina for use in high temperature refractories while simultaneously recovering said metal alloy.

6. A method according to claim 1 including adding scrap iron to the smelter slag and reducing agent to reduce the slag in a more cost effective manner and also to produce a desired Fe:Si ratio within the metal alloy (here ferrosilicon).

7. A modification of the method according to claim 1 wherein the method is conducted in two stages by first adding a minimum amount of reducing agent sufficient to produce said metal alloy comprising iron and containing most of the said at least one heavy metal, removing the metal alloy, and then adding more reducing agent to produce ferrosilicon substantially free of said at least one heavy metal and said secondary slag containing calcium silicate, calcium aluminate, fused alumina or a calcium iron aluminum silicate compound.

8. A method according to claim 1 wherein the said metal alloy containing said at least one heavy metal is recycled into an appropriate vessel or furnace, to recover said at least one heavy metal from the metal alloy to the matte and to recover further metals by utilizing the reducing capacity or iron to reduce metal oxides that may be present in the smelter slag.

9. A process according to claim 1 conducted in association with a metallurgical converter treating smelter matte whereby converter slag is poured into a converter containing or to which said reducing agent and calcium oxide are added, the secondary slag is poured off while the metal alloy remains in the converter, and a batch of smelter matte is added to the converter containing said at least one heavy metal, and the process cycle is repeated until an enriched converter matte is produced.

10. A process according to claim 1 conducted in association with the discharge of smelter slag to slag pot, to transfer slag to slag heaps, including mixing said reducing agent and calcium oxide in the slag pots along with the molten slag and transferring the treated slag in the slag pots to a suitable location for dumping and separation of said metal alloy, recycling said metal alloy in its solid state to another vessel or smelter and utilizing the secondary slag for suitable manufacturing purposes.

11. A process according to claim 1 including adding said reducing agent and calcium oxide on top of the base metal slag at a discharge end of a smelter.

* * * * *